(12) United States Patent
Kowalchuk

(10) Patent No.: US 6,899,042 B1  
(45) Date of Patent: May 31, 2005

(54) CLEANUP SYSTEM FOR A PLANTING IMPLEMENT

(75) Inventor: Trevor L. Kowalchuk, Saskatoon (CA)

(73) Assignee: CNH Canada, Ltd., Racine, WI (US)

( * ) Notice: Subject to any disclaimer, the term of this patent is extended or adjusted under 35 U.S.C. 154(b) by 0 days.

(21) Appl. No.: 10/925,586

(22) Filed: Aug. 25, 2004

(51) Int. Cl.$^7$ ................................................ A01C 7/04
(52) U.S. Cl. ........................ 111/174; 111/200; 111/900
(58) Field of Search .................... 111/170, 174–176, 111/179–182, 185, 200, 900; 221/211

(56) References Cited

U.S. PATENT DOCUMENTS

| | | |
|---|---|---|
| 1,499,937 A | 7/1924 | Leathers |
| 1,750,800 A | 3/1930 | Gould |
| 1,942,358 A | 1/1934 | Grathwol |
| 3,011,627 A | 12/1961 | Frost |
| 3,230,569 A | 1/1966 | Nielsen |
| 3,648,837 A | 3/1972 | Ogle |
| 3,764,232 A | 10/1973 | Brown |
| 3,841,553 A | 10/1974 | Taylor |
| 3,998,385 A | 12/1976 | Ogle |
| 5,170,909 A | 12/1992 | Lundie et al. |
| 5,454,139 A | 10/1995 | Beck |
| 5,515,795 A | 5/1996 | Ledermann et al. |
| 5,740,747 A | 4/1998 | Stufflebeam et al. |
| 6,145,455 A | 11/2000 | Gust et al. |
| 6,401,638 B1 | 6/2002 | Crabb et al. |
| 6,527,205 B2 | 3/2003 | Andersson et al. |
| 6,564,730 B2 | 5/2003 | Crabb et al. |
| 6,668,738 B2 | 12/2003 | Lee et al. |
| 2003/0116068 A1 | 6/2003 | Sauder et al. |

Primary Examiner—Christopher J. Novosad  
(74) Attorney, Agent, or Firm—Rebecca Henkel; Brant T. Maurer

(57) ABSTRACT

A planting implement is configured with a cleanup system for the removal of product associated with operation of the planting implement. The planting implement generally includes a fluid pressure source in combination with at least one planting unit configured to deposit the product at a controlled rate in an agricultural field. The cleanup system generally includes a product separator with an inlet line and a collection line. The inlet line communicates the vacuum pressure generated by the pressure source to the product separator. The collection line communicates the vacuum pressure at the product separator to a location of the product on the planting implement. The vacuum pressure at the collection line is operable to entrain the product in a combined product and forced air stream that is conveyed by the collection line for removal at the product separator.

20 Claims, 2 Drawing Sheets

CLEANUP SYSTEM FOR A PLANTING IMPLEMENT

FIELD OF INVENTION

The invention relates to a planting implement configured to deliver product in an agricultural environment and, more particularly, to a planting implement having a cleanup system configured to remove product from the storage hoppers of the planting implement.

BACKGROUND OF THE INVENTION

In recent years, product delivery systems have been employed in agricultural implements to deliver seed, fertilizer and herbicides to planting units. As the size of agricultural implements continues to grow, the versatility of such implements becomes more significant.

Planting implements are of various designs to dispense seeds, fertilizer, and herbicides at a controlled rate to an agricultural field. In a conventional arrangement, a tractor is coupled to tow the planting implement across the agricultural field. The planting implement generally includes a tool bar to which are attached a plurality of planting units in a generally parallel, spaced relation apart. Each planting unit typically includes a seed hopper for containing and carrying a large quantity of seeds to be planted or a smaller container fed from a centralized in or large hopper, a device for opening a furrow in the ground as the tractor drawn tool bar is advanced across the field over the ground, a metering mechanism coupled to the seed hopper for dispensing individual seeds into the furrow at a controlled rate, and a further device for moving soil at the sides of the furrow to close the furrow over the seeds.

The many different types of seeds to be planted using a planting unit can include corn, cotton, sorghum, sugar beets, soybeans and sunflowers to name a few. As will be appreciated, such seeds vary considerably in size, weight and shape. For example, peanut and edible bean seeds are among the largest seeds for planting and have elongated irregular shapes and outer surfaces. Soybean, and palletized seeds are smaller and tend to be rounder and vary in shape and size. Sorghum and raw sugar beet seeds have a rounder almost spherical appearance. Sorghum seeds have a relatively smooth outer surface. On the other hand, raw sugar beet seeds have a very rough and irregular outer surface configuration. Cotton seed is small and shaped like some corn seed. In contrast, corn seeds have a somewhat triangular shape with generally flat sides. Despite these numerous differences in the size, shape and surfaces of such seeds, the planting unit is required to handle all the different types of seeds described above plus many more while requiring minimum effort regarding part changes and adjustments.

A wide variety of agricultural planting units are generally available, depending on the type and the form of the product being metered and the desired accuracy and consistency of metering. In general, conventional planting units can be of the mechanical type or the air pressure differential type.

The mechanical type of planting unit generally includes a vertical or horizontal seed plate or disc with mechanically actuated fingers of similarly operated mechanical devices for separating individual seeds from the seed disc and then dispensing them into the furrow. The air pressure differential type planting unit, which are commonly known as air seeders, are generally of two types: a negative pressure type and a positive-pressure type.

The vacuum-type air seeder generally includes a pressure source coupled to a chamber opposite a seed mass or supply, with a metering mechanism therebetween. The pressure source communicates a vacuum through openings in the metering mechanism to the seed mass. The vacuum is of sufficient magnitude such that it tends to draw seeds into the openings defined by the metering mechanism and hold the seeds thereto as the seeds are moved through the chamber under the influence of the moving metering mechanism toward a seed discharge area for application in an agricultural field.

An example of a vacuum-type of air seeder is a plate seeder. A conventional plate seeder generally includes a rotatable plate having a plurality of openings therethrough about its outer perimeter. With such plate systems, product is delivered to a first side of the rotatable plate while a vacuum source (e.g., fan or blower) provides a vacuum on a second opposite side of the rotatable plate. This vacuum draws and retains individual product in the openings against the rotatable plate. During rotation, the rotatable plate carries the product to locations above seed delivery tubes, where the vacuum is broken such that the product falls from the rotatable plate and into a tube for delivery to the agricultural field.

The typical positive-pressure type of air seeder includes a pressure configured to convey a forced air stream into a seed chamber and onto a surface of a rotating or otherwise movable and apertured metering mechanism or disc in order to create a higher than atmospheric pressure (i.e., positive pressure) in the chamber. This positive-pressure air stream forces the seed from a seed mass and onto the metering mechanism, where the seed is retained for later release. The apertures or holes in the rotating metering mechanism open to the atmosphere in a known manner such that the individual seeds are held by the forced air stream. When the forced air stream is interrupted, the seed is dispensed to the agricultural field.

An example of the positive-pressure type of air seeder is a pneumatic seeder. A conventional pneumatic seeder generally includes a meter roller assembly having flutes located at the bottom of a material compartment and fed product by gravity from a bulk fill hopper. The product is metered by the roller assembly of flutes into a pneumatic distribution system. Typically, the pneumatic distribution system includes a force air source or blower operable to provide a forced air stream through distribution lines configured to convey the metered product to a series of secondary distribution manifolds ("headers"), which in turn distribute product to a group of ground openers mounted on the seeding implement operable to place seed in the ground. The ground openers are configured to evenly deliver the product to the span of ground (the "seedbed") acted upon by the seeding implement.

Another example of a positive-pressure type of planting unit is an air cart combined with an inductor assembly that is adapted to entrain seed or other product from a large bulk fill hopper into a forced air stream for conveyance to relatively smaller seed bins, mini-hoppers, or reservoirs located at receivers remotely located from the hopper. The bulk fill hopper allows a farmer to plant more acreage before having to stop to fill the central storage hopper again, resulting in quicker planting and less labor while maintaining the precision spacing available by on-row singulation. A forced air system or fan provides the stream of forced air through a nurse inductor system along a path to agitate and entrain the seed particulates from the bulk fill hopper. The distribution system generally includes one or more distribution lines operable to route or direct the combined stream of forced air and entrained product from the inductor assembly toward one or more receivers. The receivers are configured to perform on-row planting of the seed product to an agricultural field. Each receiver generally includes one or more seed bins or mini-hoppers located on top of a respective seed metering unit and an injector configured to uniformly apply the seed into a furrow in the ground.

These certain known air seeders and planters as described above have several drawbacks. Typically, farmers require that the implements be cleaned-out after planting or that the seed types be changed from one variety to another. However, known implements do not provide for an efficient method to change-out or clean-out product from the bulk fill hopper, the metering mechanism, and the planting units or receivers. To clean-out or change-out the certain known bulk fill hoppers, metering mechanisms, receivers, etc., the farmer must empty the bulk fill hopper, and then manually remove and disassemble the metering mechanism and/or receiver so as to empty-out the product. Alternatively, farmers use portable shop vacuums to clean-out the implements. This clean-out process of using portable shop vacuums and the like is cumbersome and very time-consuming and requires the use of an external power source apart from the implement or tractor.

There is thus a need for an improved method of cleaning or switching product of an implement. To achieve this end, there is a desire for a cleanup system for removing residual product from the bulk fill hopper, the metering mechanism, the receiver, etc. of the implement. The method for and system of cleanup needs to be simple, reliable, durable, and efficient for ready use on a planting implement in an agricultural setting or environment.

SUMMARY OF THE INVENTION

The present invention provides a system for the removal of product from a planting implement having a fluid pressure source in combination with at least one planting unit configured to deposit the product at a controlled rate in an agricultural field. The pressure source generally includes an inlet and an outlet and is operable to generate a vacuum pressure. The removal system generally includes an inlet line, a product separator, and a collection line. The inlet line is connected to communicate the vacuum pressure generated by the pressure source to the product separator. The product separator generally includes a first inlet and a second inlet. The first inlet of the product separator is connected to receive the vacuum pressure communicated via the inlet line from the pressure source. The product separator is configured to provide the vacuum pressure to the second inlet. The collection line is connected to communicate the vacuum pressure at the second inlet of the product separator to a location of the supply of the product on the planting implement desired for removal. The vacuum pressure at the collection line is operable to entrain the supply of the product on the planting implement in a combined product and forced air stream that is conveyed by the collection line to the second inlet of the product separator.

A preferred embodiment of the removal system includes a first valve located to regulate the vacuum pressure communicated through the inlet line to the product separator, and a second valve located to interrupt communication between the pressure source and the at least one planting unit. The removal system also includes a product removal valve attached at the outlet end of the product separator. The product separator is configured to separate the product from the combined stream of product and forced air, and the product removal valve is configured to regulate removal of the separated product from the product separator. The removal system can be mounted on the planting implement for travel over the agricultural field, or configured as a modular package for connection to the planting implement. The pressure source can be a positive-pressure type or a negative-type pressure source. For a negative-type pressure source, the product separator is connected via the inlet line to an outlet of the positive-type pressure source. For a positive-type pressure source, the product separator is connected via the inlet line to an inlet of the positive-type pressure source. The preferred removal system can further include a Y-connector interconnecting the pressure source with planting unit and with the cleanup system. The Y-connector includes an inlet end in communication with a first outlet end and a second outlet end. The inlet end is connected to receive the forced fluid stream of the pressure source. The first outlet end is connected to communicate the forced fluid stream to the product separator. The second outlet end is connected to communicate the forced fluid stream to the at least one planting unit. The removal system thus can be selectively operated while the planting implement is in the agricultural field by opening and closing the series of valves accordingly to divert the vacuum pressure from the planting unit to the product separator.

The present invention also provides an agricultural implement that is generally configured to deposit product in an agricultural field. The planting implement generally includes a pressure source operable to generate a vacuum pressure, a plurality of planting units configured with the pressure source to deposit the product at a controlled rate in an agricultural field, and a removal system. The removal system generally includes an inlet line connected to communicate the vacuum pressure from the pressure source to a product separator. The product separator includes a first inlet and a second inlet. The first inlet of the product separator is connected to receive the vacuum pressure via the inlet line from the pressure source. The product separator is configured to provide the vacuum pressure at the first inlet to the second inlet. The removal system further includes a collection line connected to communicate the vacuum pressure at the second inlet of the product separator to a location of the supply of the product on the planting implement. The vacuum pressure communicated by the collection line is operable to entrain the product in a combined stream of product and forced fluid that is conveyed by the collection line to the product separator.

Furthermore, the present invention provides a method of removing a product from a planting implement. The planting implement includes a pressure source in communication with at least one planting unit, the method comprising generating a vacuum pressure with the pressure source; conveying the vacuum pressure to a collection line of a product separator; applying the vacuum pressure at the collection line to the product of the air differential type planting implement; entraining the product in a forced air stream associated with the vacuum pressure provided at the collection line; conveying the combined product and forced fluid stream to the product separator; and separating the product from the combined product and forced fluid stream in the product separator.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

A wide variety of agricultural implements could be constructed in accordance with the invention defined by the claims. Hence, while preferred embodiments of the invention will now be described with reference to a cleanup system for a planting unit, it should be understood that the invention is in no way so limited. The type of agricultural implement (e.g., spreader, planter, etc.) can vary. Moreover, the invention can be utilized to convey a wide variety of product (e.g., seed, fertilizer, herbicide, pesticide, etc.) and is not limiting on the invention. Specifically in regard to seed, the type and size of the seed (e.g., soybean, corn, cereal grains, etc.) can vary.

Figure 1:
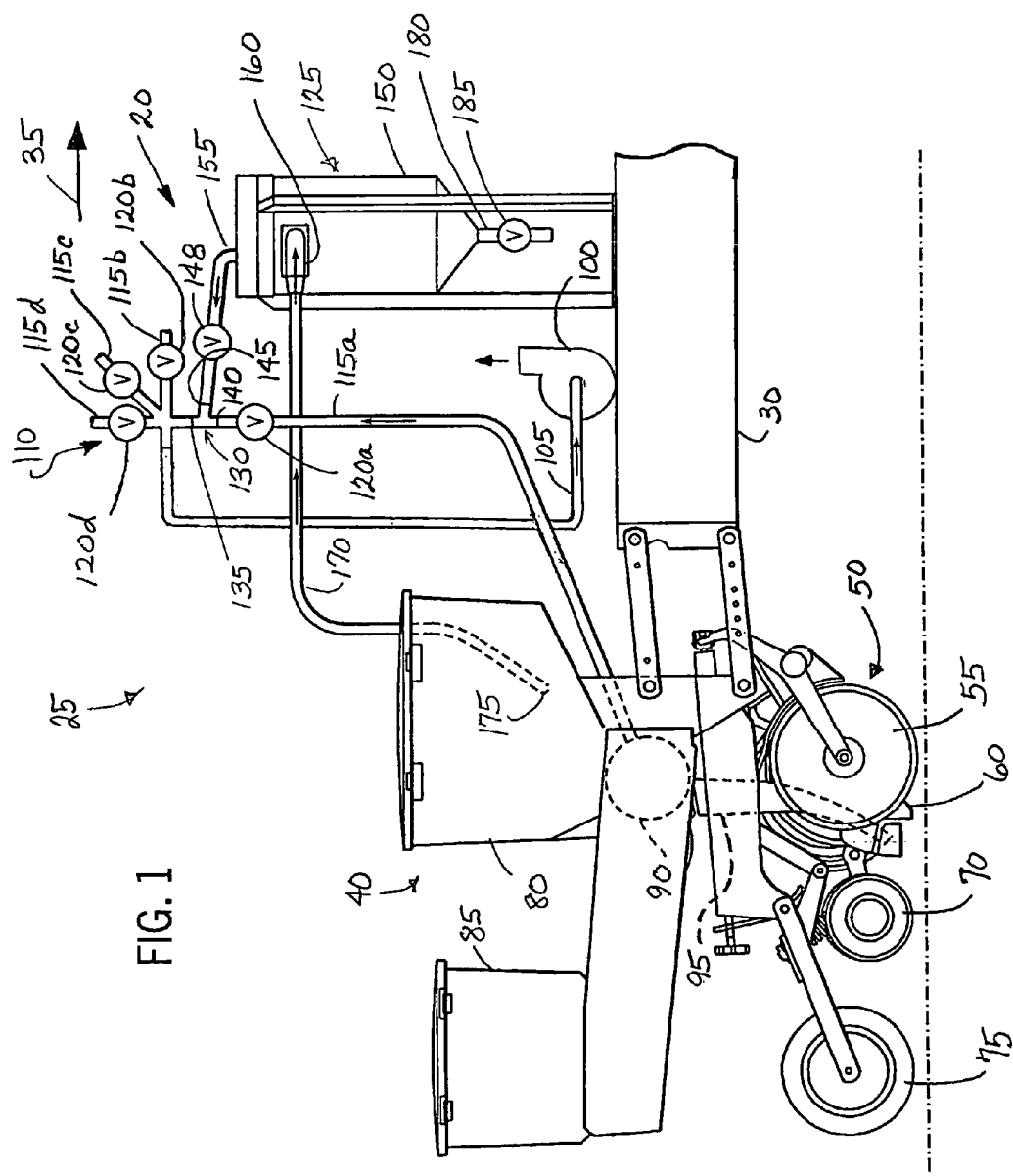
FIG. 1 illustrates a schematic diagram of a first embodiment of a removal system in combination with a negative-pressure type pressure source of a planting implement in accordance with the present invention.

Referring now to the drawings, wherein like reference numerals indicate like parts throughout the several views, FIG. 1 illustrates a cleanup system 20 in accordance with the present invention in combination with a planting implement 25 as described in U.S. Pat. No. 6,401,638 entitled "Seed Planter Apparatus and Method", filed Mar. 17, 2000, the entirety of which is hereby incorporated herein by reference. The planting unit or implement 25 generally includes an elongated tool bar 30 which is supported for movement across and over fields by a plurality of wheels (not shown) and which is adapted to be towed in a given forward direction 35 by a tow vehicle (e.g., tractor or the like that is not shown). Attached to the tool bar 30 are a series of planting units 40, with only one being illustrated and described in detail and from which a complete understanding of the present invention may be readily determined. As is well known in the art, the planting units 40 are mounted in side-by-side relation relative to each other along the length of the tool bar 30.

In the illustrated embodiment, each planting unit 40 preferably includes a conventional furrow opening apparatus generally indicated in FIG. 1 by reference numeral 50. As is known in the art, the furrow opening apparatus 50 preferably includes a pair of lateral spaced furrow opener discs 55, and a furrow forming point 60. Alternatively, and without detracting or departing from the spirit and scope of the present invention, the planting unit 40 can be provided with a runner opener type for providing a furrow in the ground. The planting unit 40 further includes a pair of furrow closer discs 70 and a trailing press wheel 75 arranged in for-and-at relationship relative to each other.

A hopper 80 is likewise carried on each planting unit 40. The purpose of the hopper 80 is to provide storage for product or material that is to be gravitationally deposited to the ground as the planting unit 40 moves over and across the field. It will be appreciated that alternative hoppers (not shown) that are smaller than that exemplified in the drawings, and connected to a centralized bin or large hopper (not shown) of the planting implement 25, would equally suffice without detracting or departing from the spirit and scope of the present invention. The planting implement 25 can further include other hoppers 85 configured in a known manner so as to apply multiple products or materials (e.g., fertilizer, herbicide, and seed) to the ground.

In the illustrated embodiment, a metering mechanism 90 or apparatus is arranged in a receiving relation relative to the hopper 80 and, in the illustrated embodiment, forms part of the planting unit 40. The purpose of the metering mechanism 90 is to uniformly release product received from the hopper 80 for deposit onto the ground. To facilitate delivery of product from the metering mechanism 90 to the ground, a vertically disposed product tube 95 is mounted on the planting unit 40. In general, the product tube 95 is a vertical passage through which seeds are delivered to the ground.

As the tow vehicle or tractor (not shown) pulls the tool bar 30 across and over the ground, the furrow opening apparatus 50 operates to open a furrow in the ground. Product from the hopper 80 flows into the metering mechanism 90, where from product is introduced at a controlled rate into the product tube 95 to uniformly move through the vertical passage defined by product tube 95 and are, ultimately, deposited onto the ground. The furrow closer discs 70 trails the furrow opening apparatus 50 and, as the planting implement 25 is drawn across the field, serves to close the furrow together and over the product dispensed by the metering mechanism 90 into the furrow. The trailing press wheel 75 serves to compact the soil closed over the product.

The metering mechanism 90 is mounted to and movable with the hopper 80 relative to tool bar 30 (FIG. 1) of the planting unit 40 and relative to the product tube 95. Moreover, the hopper 80 is mounted on and removable from the planting unit 40 in a conventional manner. As shown in FIG. 1, the metering mechanism 90 is arranged toward the bottom of, and in a receiving relation relative to, the hopper 80.

A pressure source 100 is connected via a suitable conduit 105 to each metering mechanism mounted to each planting unit. The pressure source 100 is suitably mounted to the planting implement 25 for travel across the agricultural field. The pressure source 100 is operable to generate a pressure differential, which in combination with the metering mechanism 90, conveys the product in the hopper 80 in a controlled manner for application in the field. The preferred pressure source 100 is a vacuum or negative-type source operable in a known manner to provide a vacuum pressure to the metering mechanism 90 for the controlled release of product in a known manner from the hopper 80 to the ground. The number and type (e.g., blower, vacuum pump, fan, etc.) of pressure sources 100 can vary.

The exemplary pressure source 100 is typically connected via a manifold 110 to a series of distribution headers 115a, 115b, 115c, and 115d. Each distribution header is generally configured to communicate the vacuum pressure of the pressure source to one or more of the series of planting units 40. The number of distribution headers 115 in association with the series of planting units 40 can vary. As illustrated in FIG. 1, the series distribution headers 115a-d include a series of respective valves 120a-d that are each configured to regulate the communication of the vacuum pressure through the respective distribution header 115a-d to the associated planting units 40 attached thereto. A typical type of valve 120a-d is a butterfly valve, but the type of valve 120a-d can vary.

The cleanup system 20 of the present invention generally includes a product separator 125 interconnected with the pressure source 100 described above in such a manner so as to withdraw or remove product from the hopper 80 or miscellaneous other locations of each of the series of planting units 40. The preferred cleanup system 20 is mounted on the planting implement 25 to allow an operator to cleanup, remove or withdraw product from the hopper 80 while in a remote location (e.g., the agricultural field).

Referring to FIG. 1, a Y-connector 130 is connected between the valve 120a and the manifold 110. The Y-connector 130 includes an inlet end 135, a first outlet end 140 and a second outlet end 145. The inlet end 135 of the Y-connector 130 is attached at the manifold 110, and the first outlet end 140 is attached at the valve 120a and the associated distribution header 115a. The second outlet end 145 of the Y-connector is connected to a valve 148.

The product separator 125 is generally operable to separate the product from a combined stream of product and forced air. The product separator 125 is mounted at the tool bar 30 with the pressure source 100, but the location of the product separator 125 can vary. The product separator 125 generally includes separator vessel 150 having an inlet 155 and an outlet 160. The inlet 155 is configured to receive a vacuum pressure or forced fluid stream from the pressure source 100 via valve 148 and the second outlet end 145 of the Y-connector 130. The separator vessel 150 communicates the vacuum pressure to the outlet 160 of the product separator 125. The outlet 160 is connected to a vacuum line 170 having a vacuum inlet 175. The preferred vacuum line 170 is of desired length of flexible construction to reach in the hopper 80 of the planting unit 40. The product separator 125 communicates the vacuum pressure to the vacuum inlet 175 of the vacuum line 170. The vacuum pressure provided at the vacuum inlet 175 of the vacuum line 170 is such as to entrain the product in the hopper 80 into a combined stream of product and forced air. The combined stream of product and forced air enters the vacuum inlet 175 and travels through the vacuum line 170 to the separator vessel 150 of the product separator 125. The preferred separator vessel 150 is configured to create a cyclone effect in a known manner such that the product falls by gravity to a product outlet 180. The product separator 125 further includes a shutoff valve 185 configured to selectively release the removed product to a separate storage hopper (not shown) for recycled use of the recovered product.

In operation, the planting implement 25 is towed across an agricultural field with a supply of product in the hopper 80. When planting, the valve 120a is in an open position and the valve 148 is in a closed position such that the pressure source 100 provides a vacuum pressure at the metering mechanism 90. The other valves 120b-d can be open as desired to provide the vacuum pressure to others in the series of planting units 40. The metering mechanism 90 provides the vacuum pressure to the supply of product delivered from the hopper 80 in a known manner such that the metering mechanism 90 deposits the product at a controlled rate in the ground. To remove the residual product from the hopper 80 or to switch to application of another product, an operator closes preferably all of the valves 120a-d and opens the valve 148, thereby communicating the vacuum pressure from the pressure source 100 to the product separator 125. Yet, the number and combination of valves 120a-d that are closed can vary. The operator directs the vacuum-pressure at the vacuum inlet 175 of the vacuum line 170 into the hopper 80 to remove or withdraw residual product. The product separator 125 receives a combined stream of product and forced air, and separates the product from the forced air stream. The operator can selectively open the valve 185 to remove the product from the product separator 125.

Figure 2:
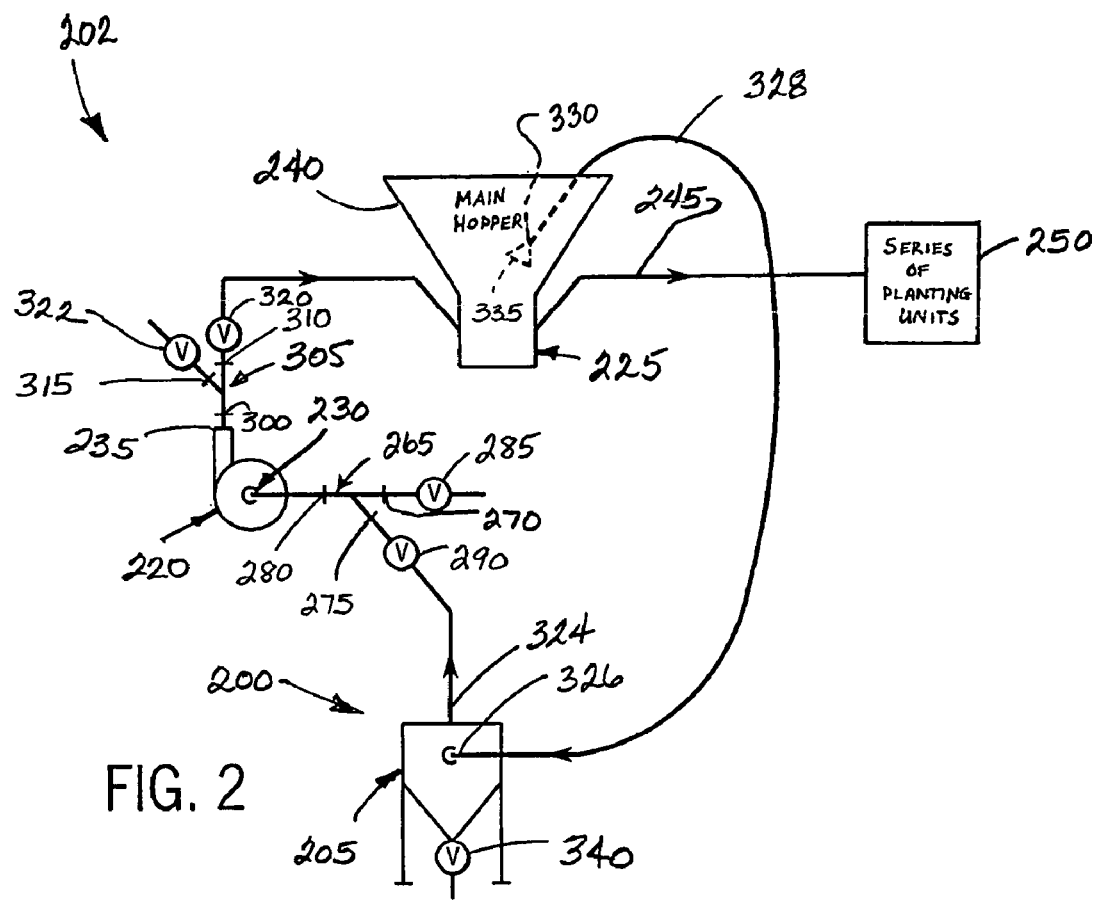
FIG. 2 illustrates a schematic diagram of a second embodiment of a removal system in combination with a positive-type pressure source of a planting implement in accordance with the present invention.

FIG. 2 illustrates a schematic diagram representative of another embodiment of a cleanup system 200 in accordance with the present invention in combination with a planting implement 202. The cleanup system 200 includes a product separator 205 configured in a manner similar to the product separator 125 described above. However, in contrast to the cleanup system 20 described above, the cleanup system 200 is configured with a positive-type pressure source 220 interconnected with an inductor assembly 225 as described in U.S. application Ser. No. 10/772,821, entitled "Opposed Inductor Improvements", filed Feb. 5, 2004, the entirety of which is hereby incorporated herein by reference. The positive-type pressure source 220 generally includes an inlet end 230 and an outlet end 235, and is configured to provide a forced air stream under positive pressure (above atmospheric pressure) from the outlet end 235 to the inductor assembly 225 located below a main hopper 240 of product. The inductor assembly 225, in a known manner, is configured to guide the forced air stream in a path to engage a supply product delivered from the hopper 240 to the inductor assembly 225. In the inductor assembly 225, the forced air stream entrains the product in a combined stream with the forced air. A distribution system 245 communicates the combined stream of product and forced air from the inductor assembly 225 to a series of remote planting units 250. Each planting unit 250 generally includes a mini-hopper 255 and a metering mechanism 260. In a known manner, the mini-hopper 255 receives the product from the distribution system 245, and the metering mechanism 260 deposits the product at a controlled rate in the ground. Alternatively, the cleanup system 200 can be connected in a similar manner to a positive-type pressure source of a venturi system as described in U.S. Pat. No. 6,668,738 entitled "Bulk Fill Delivery Venturi System," filed Mar. 21, 2002, the entirety of which is hereby incorporated herein by reference.

The cleanup system 200 includes a first Y-connector 265 connected at the inlet end 230 of the positive-type pressure source 220. The first Y-connector 265 generally includes a first inlet end 270, a second inlet end 275, and an outlet end 280. The first inlet end 270 is attached in communication with a valve 285 and is configured to provide an intake of atmospheric air to the positive-type pressure source 220. The second inlet end 275 is attached in communication with a valve 290 and with the product separator 205. The outlet end 280 of the first Y-connector 265 is connected to inlet end 230 of the positive-type pressure source 220.

The outlet end 235 of the positive-type pressure source 220 is connected to an inlet end 300 of a second Y-connector 305. The second Y-connector 305 includes a first outlet end 310 and a second outlet end 315. The first outlet end 310 of the Y-connector 305 is connected to a valve 320 to regulate the forced air stream delivered to the inductor assembly 225. The second outlet end 315 of the second Y-connector 305 is connected with a valve 322 configured to regulate the discharge of the forced air stream to the atmosphere.

The product separator 205 includes an outlet 324 and inlet 326. The outlet 324 of the product separator 205 is connected to the second inlet end 275 of the first Y-connector 265 and the associated valve 290. The inlet 326 of the product separator 205 is interconnected with a vacuum line 328 having a vacuum inlet 330. In a similar manner to the product separator 125 described above, the product separator 205 provides communicates a positive-type pressure associated with the inlet end 230 of the positive-type pressure source 220 to the vacuum inlet 330 of the vacuum line 328. The desired length of the vacuum line 328 is of length to reach the hopper 240 or to each of the series of mini-hoppers associated with the planting units 250. The vacuum inlet 330 of the vacuum line 328 may include a nozzle 335 to increase the vacuum pressure at the respective hopper 240.

When planting, the valve 285 and the valve 320 are placed in an open position and the valve 290 and the valve 322 are placed in a closed position such that the positive-type pressure source 220 provides a forced air stream under positive pressure to the inductor assembly 225. The inductor assembly 225 provides the forced stream of air to the supply of product delivered from the hopper 240 into the inductor assembly 225. The combined stream of product and air discharged from the inductor assembly 225 is conveyed by a distribution system to the series of planting units. In a known manner, the planting units 250 separate the product from the forced air stream, and deposit the product at a controlled rate in the ground. To remove the residual product from the hopper 240 or from the mini-hoppers associated with the series of planting units 250, the operator places the valve 285 and the valve 320 in a closed position and places the valve 290 and the valve 322 in an open position such that the inlet of the positive-type pressure source 220 provides the vacuum pressure to the product separator 205. The operator directs the vacuum pressure at the vacuum inlet 330 of the vacuum line 328 into the hopper 240 or the mini-hoppers to remove or withdraw the residual product. The product separator 205 receives the combined stream of product and forced air, and separates the product from the forced air stream. The operator can selectively open a product removal valve 340 to remove the product from the product separator 205.

The embodiments of the cleanup systems 20 and 200 described above are described in combination with the planting implements 25 and 202 having a hopper 80 and 240 and a pressure source 100 and 220 configured to provide a fluid stream (e.g., vacuum of air) to convey product for application in the agricultural environment. Although the above-description referred to a cleanup system 20 and 200 combined with a vacuum-type pressure source 100 or positive-type pressure source 220 mounted on the planting implements 25 and 202, respectively, it is understood that the cleanup system 20 and 200 is adaptable for use with a stand-alone pressure source and product storage tank, as well as adapted for incorporating with other types of agricultural implements. Furthermore, each of the above described embodiments of the cleanup system 20 and 200 can be provided as package with a planting implement or as a modular unit for attachment to a planting implement. A quick connect mechanism (not shown) can facilitate the convenient connection of the cleanup system to a conventional planting implement as a modular unit.

Many changes and modifications could be made to the invention without departing from the spirit thereof. The scope of these changes will become apparent from the appended claims.

I claim:

1. A system for removing a supply of a product from a planting implement, the planting implement including a fluid pressure source operable to provide a forced fluid stream that is used in combination with at least one planting unit in the distribution of the product in an agricultural field, the pressure source being operable to generate a vacuum pressure, the system for removing the product comprising:
   an inlet line connected to communicate the vacuum pressure generated by the pressure source;
   a product separator having an first inlet, a second inlet, the first inlet connected to receive the vacuum pressure communicated from the pressure source via the inlet line, the product separator configured to provide the vacuum pressure to the second inlet; and
   a collection line connected to communicate the vacuum pressure at the second inlet of the product separator to a location of the supply of the product on the planting implement, wherein the vacuum pressure communicated by the collection line is operable to entrain the supply of the product in a combined product and forced air stream that is conveyed by the collection line to the second inlet of the product separator.

2. The removal system as recited in claim 1, further comprising:
   a first valve located to regulate the vacuum pressure communicated through the inlet line to the product separator.

3. The removal system as recited in claim 2, further comprising:
   a second valve located to interrupt communication between the pressure source and the at least one planting unit.

4. The removal system as recited claim 3, wherein the removal system is mounted on the planting implement for travel over the agricultural field.

5. The removal system as recited in claim 2, further comprising:
   a third valve attached at the outlet of the product separator, wherein the product separator is configured to separate the product from the combined stream of product and forced air, and wherein the third valve is configured to regulate removal of the product through the outlet of the product separator.

6. The removal system as recited in claim 5, further including a y-connector having a first open end in communication with a second open and a third open end, the first open end connected to receive the forced fluid stream of the pressure source, the second open end connected to communicate the forced fluid stream to the product separator, and the third open end connected to communicate the forced fluid stream to the at least one planting unit.

7. The removal system as recited in claim 5, further comprising a second pressure source designated to provide a predetermined vacuum pressure to the product separator that is communicated by the collection in the removal of product from the product implement.

8. The removal system as recited in claim 1, wherein the pressure source is a positive-pressure type, and the product separator is connected via the inlet line to an inlet of the pressure source.

9. The removal system as recited in claim 1, wherein the pressure source is a negative-type, and the product separator is connected via the inlet line to an outlet of the pressure source.

10. The planting implement configured to deposit product in an agricultural field, comprising:
  a plurality of planting units configured with a pressure source to deposit the product at a controlled rate in an agricultural field;
  a removal system mounted on the planting implement, comprising:
    an inlet line connected to receive a vacuum pressure generated by the pressure source;
    a product separator having an first inlet and a second inlet, the first inlet connected to receive the vacuum pressure via the inlet line from the pressure source, the product separator configured to provide the vacuum pressure at the second inlet; and
    a collection line connected to communicate the vacuum pressure at the second inlet of the product separator to a location of the supply of the product on the planting implement, wherein the vacuum pressure communicated by the collection line is operable to entrain the product in a combined stream of product and forced fluid that is conveyed by the collection line to the product separator.

11. The planting implement as recited in claim 10, further comprising:
  a pressure source operable to generate a vacuum pressure, the pressure source configured to communicate a forced fluid stream to the planting unit; and
  an inlet line connected to communicate the vacuum pressure from the pressure source to the first inlet of the product separator.

12. The planting implement as recited in claim 10, further comprising
  a first valve located to regulate the vacuum pressure communicated through the inlet line to the product separator; and
  a second valve located to interrupt communication between the pressure source and the at least one planting unit.

13. The planting implement as recited in claim 10, further comprising:
  a third valve attached at the outlet end of the product separator, wherein the product separator is configured to separate the product from the combined stream of product and forced air, and wherein the third valve is configured to regulate removal of the product from the product separator.

14. The planting implement as recited in claim 10, wherein the removal system is mounted on the planting implement for travel over the agricultural field.

15. The planting implement as recited in claim 10, wherein the pressure source is a positive-pressure type, and the product separator is connected via the inlet line to an inlet of the pressure source.

16. The planting implement as recited in claim 10, wherein the pressure source is a negative-type, and the product separator is connected via the inlet line to an outlet of the pressure source.

17. A method of removing a product from an air differential type planting implement that includes a pressure source in communication with at least one planting unit, the method comprising the acts of:
  generating a vacuum pressure with the pressure source;
  conveying the vacuum pressure to a collection line of a product separator;
  applying the vacuum pressure at the collection line to the product of the air differential type planting implement;
  entraining the product in a forced air stream associated with the vacuum pressure provided at the collection line;
  conveying the combined product and forced fluid stream to the product separator; and
  separating the product from the combined product and forced fluid stream in the product separator.

18. The method of removing product from a planting implement as recited in claim 17, wherein the step of conveying the vacuum pressure to a collection line comprises:
  interrupting communication between the pressure source and the planting unit.

19. The method of removing product from a planting implement as recited in claim 17, wherein the pressure source is a positive-type pressure source operable to provide a forced fluid stream under a positive-pressure greater than atmospheric pressure, and the step of conveying the vacuum pressure includes connecting an inlet of the positive-type pressure source to an inlet of the product separator.

20. The method of removing product from a planting implement as recited in claim 17, wherein the pressure source is a negative-type pressure source, and the step of conveying the vacuum pressure includes connecting an outlet of the negative-type pressure source to an inlet of the product separator.

* * * * *